United States Patent
Sall et al.

(10) Patent No.: US 9,347,386 B2
(45) Date of Patent: May 24, 2016

(54) ALCOHOL REFORMING SYSTEM FOR INTERNAL COMBUSTION ENGINE

(71) Applicant: Monsanto Technology LLC, St. Louis, MO (US)

(72) Inventors: Erik D. Sall, St. Louis, MO (US); David A. Morgenstern, St. Louis, MO (US); James D. Wilson, II, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 32 days.

(21) Appl. No.: 14/389,676

(22) PCT Filed: Mar. 29, 2013

(86) PCT No.: PCT/US2013/034545
§ 371 (c)(1),
(2) Date: Sep. 30, 2014

(87) PCT Pub. No.: WO2013/149112
PCT Pub. Date: Oct. 3, 2013

(65) Prior Publication Data
US 2015/0107538 A1    Apr. 23, 2015

Related U.S. Application Data

(60) Provisional application No. 61/618,095, filed on Mar. 30, 2012, provisional application No. 61/781,780, filed on Mar. 14, 2013.

(51) Int. Cl.
*F02D 19/06* (2006.01)
*F02M 25/07* (2006.01)
(Continued)

(52) U.S. Cl.
CPC ............ *F02D 19/0671* (2013.01); *F02B 43/04* (2013.01); *F02D 19/084* (2013.01);
(Continued)

(58) Field of Classification Search
CPC ... F02D 19/0671; F02D 19/084; F02D 19/08; F02D 19/0655; F02D 19/0639; F02B 43/04; F02M 25/12; F02M 25/0742; F02M 27/02; F02M 31/20; F02M 33/02; F02M 33/04; Y02T 10/36; Y02T 10/126
USPC ........................... 123/1 A, 1 R, 2, 3, 543, 575
See application file for complete search history.

(56) References Cited

U.S. PATENT DOCUMENTS 4,420,462 A   12/1983   Clyde
5,253,993 A   10/1993   Birkenstock et al.
(Continued)

FOREIGN PATENT DOCUMENTS

CN   101529075 A   9/2009
DE   10346267 A1   4/2005
(Continued)

OTHER PUBLICATIONS

Emonts, B., et al., "Fuel Cell Drive System with Hydrogen Generation in Test," 2000, J Power Sources, 86:228-236.
(Continued)

*Primary Examiner* — Grant Moubry
(74) *Attorney, Agent, or Firm* — Senniger Powers LLP; James E. Davis

(57) ABSTRACT

An alcohol reforming system for an internal combustion engine includes a reformer in selective fluid communication with a fuel line via a reformer inlet line for receiving liquid fuel from the fuel line. The reformer reforms the alcohol in the alcohol-gasoline mixture of the fuel into a reformate mixture comprising hydrogen gas and gasoline. A buffer tank in fluid communication with the reformer receives the reformate mixture and disengages the hydrogen gas from the gasoline in the reformate mixture. The buffer tank includes a liquid fuel outlet in fluid communication with the fuel line for re-introducing the gasoline as a liquid into the fuel line, and a reformate gas outlet for delivering the reformate gas to a reformate line through which the reformate gas is delivered to the engine.

18 Claims, 8 Drawing Sheets

(51) Int. Cl.
*F02M 25/12* (2006.01)
*F02D 19/08* (2006.01)
*F02B 43/04* (2006.01)
*F02M 27/02* (2006.01)

(52) U.S. Cl.
CPC ........... *F02M25/0742* (2013.01); *F02M 25/12* (2013.01); *F02M 27/02* (2013.01); *Y02T 10/121* (2013.01); *Y02T 10/36* (2013.01)

(56) References Cited

U.S. PATENT DOCUMENTS

| | | | |
|---|---|---|---|
| 5,627,125 | A | 5/1997 | Ebner et al. |
| 5,689,000 | A | 11/1997 | Ebner et al. |
| 5,916,840 | A | 6/1999 | Ebner et al. |
| 6,573,213 | B1 | 6/2003 | Ostgard et al. |
| 6,739,289 | B2 * | 5/2004 | Hiltner .................. F02B 43/10 123/253 |
| 6,935,284 | B2 * | 8/2005 | Qian ..................... F02B 43/10 123/1 A |
| 7,179,313 | B2 | 2/2007 | Retallick et al. |
| 7,290,505 | B2 * | 11/2007 | Kamio ................. F02D 19/0628 123/1 A |
| 7,370,609 | B2 * | 5/2008 | Kamio ................. F02D 19/081 123/1 A |
| 7,448,348 | B2 * | 11/2008 | Shinagawa ................ C01B 3/26 123/3 |
| 7,610,896 | B2 * | 11/2009 | Kakuho ................. F02D 19/12 123/198 A |
| 7,682,724 | B2 | 3/2010 | Morgenstern |
| 8,100,093 | B2 | 1/2012 | Morgenstern |
| 8,245,671 | B2 * | 8/2012 | Leone .................. F02D 41/0027 123/3 |
| 8,967,089 | B2 * | 3/2015 | Morgenstern ............. C01B 3/22 123/1 A |
| 2006/0224027 | A1 | 10/2006 | Turek et al. |
| 2007/0028860 | A1 | 2/2007 | Hemsath |
| 2010/0254891 | A1 | 10/2010 | Giroudiere et al. |
| 2011/0132283 | A1 | 6/2011 | Czekala et al. |
| 2011/0132284 | A1 | 6/2011 | Leone et al. |
| 2011/0132285 | A1 | 6/2011 | Pursifull |
| 2011/0132286 | A1 | 6/2011 | Leone et al. |
| 2011/0132288 | A1 | 6/2011 | Pursifull |
| 2011/0132289 | A1 | 6/2011 | Pursifull et al. |
| 2011/0132290 | A1 | 6/2011 | Leone et al. |
| 2011/0132306 | A1 | 6/2011 | Kerns et al. |
| 2011/0132321 | A1 | 6/2011 | Pursifull |
| 2011/0132323 | A1 | 6/2011 | Surnilla et al. |
| 2011/0132326 | A1 | 6/2011 | Leone |
| 2011/0137537 | A1 | 6/2011 | Leone |
| 2012/0097117 | A1 | 4/2012 | Morgenstern |
| 2013/0025547 | A1 | 1/2013 | Nakagawa et al. |

FOREIGN PATENT DOCUMENTS

| | | |
|---|---|---|
| EP | 1691065 A1 | 8/2006 |
| JP | 61175245 | 6/1986 |
| WO | 2006045744 A1 | 5/2006 |
| WO | 2007018992 A2 | 2/2007 |
| WO | 2007118950 A1 | 10/2007 |
| WO | 2011088982 A1 | 7/2011 |
| WO | 2012135583 A1 | 10/2012 |

OTHER PUBLICATIONS

International Search Report dated Aug. 27, 2012, issued in PCT/US2012/031382, 8 pages.
International Preliminary Report on Patentability dated Oct. 10, 2013, issued in PCT/US2012/031382, 12 pages.
International Search Report dated Jul. 15, 2013, issued in PCTY/US2013/034553, 5 pages.
International Preliminary Report on Patentability dated Oct. 9, 2013, issued in PCT/US2013/034553, 9 pages.
International Search Report dated Aug. 14, 2013, issued in PCT/US2013/034545, 4 pages.
International Preliminary Report on Patentability dated Oct. 9, 2014, issued in PCT/US2013/034545, 6 pages.

* cited by examiner

ALCOHOL REFORMING SYSTEM FOR INTERNAL COMBUSTION ENGINE

FIELD OF THE INVENTION

The present invention generally relates to an alcohol reforming system for an internal combustion engine and a method of reforming alcohol on-board a vehicle having an internal combustion engine.

BACKGROUND OF THE DISCLOSURE

Alcohol reformate is superior to the parent alcohol as a fuel for internal combustion engines. The superiority of alcohol reformate, particularly those formed from methanol and ethanol, is primarily due to the presence of hydrogen. Reformate burns faster than the starting alcohol and is more tolerant of dilution with air or exhaust. At part load, dilution benefits efficiency by reducing throttling losses and loss of heat of combustion to the coolant. In addition, the heat of combustion of reformate is greater than that of the starting alcohol. Both alcohols and reformate are high octane fuels which can tolerate high compression ratios.

SUMMARY OF THE DISCLOSURE

The present disclosure is concerned with the operation of vehicles fueled by gasoline-alcohol mixtures in which fuel reforming is conducted onboard the vehicle driven by exhaust heat. In one aspect, E85 or other alcohol-gasoline fuel blends pass through a reactor known as a "reformer" which is typically maintained at a temperature of about 300-350° C. with exhaust heat. A catalyst in the reformer catalyzes the transformation of the alcohol component of the fuel into a mixture of permanent gases according to equations 1 and 2 for ethanol and equation 3 for methanol.

$$CH_3CH_2OH \rightarrow CH_3CHO + H_2 \qquad (1)$$

$$CH_3CHO \rightarrow CH_4 + CO \qquad (2)$$

$$CH_3OH \rightarrow CO + 2H_2 \qquad (3)$$

The product contains a mixture of permanent gases known as "reformate" along with liquids, primarily gasoline along with some unreacted alcohol and acetaldehyde. Gasoline does not react at 300-350° C. The product is cooled by heat exchange and passes into a "buffer tank" which serves as a reservoir for the gaseous fuel while disengaging the liquids.

The hydrogen content of the reformate makes it an attractive motor fuel, since it enables dilute operation of the engine at part load (open throttle and/or with high levels of EGR). Thus, reformed alcohol vehicles operate on two fuels: reformate and liquid fuel. The latter is partially depleted of ethanol by reforming. The reformer and other subsystems need to provide a reliable supply of reformate and manage the composition of the liquid fuel stream. However, the value of reformate is greatest at part load. At high load (2000 rpm, 8.5 bar NMEP) the dilution tolerance provided by reformate does not improve efficiency in part because the amount of diluent (EGR or excess air) that can be used is limited and also because of the value of the charge cooling of liquid ethanol at high load.

In one aspect, an alcohol reforming system for an internal combustion engine generally comprises a fuel system configured to deliver liquid fuel comprising an alcohol-gasoline mixture to the internal combustion engine, the fuel system including a fuel line through which the liquid fuel is delivered to the engine; a reformer in selective fluid communication with the fuel line via a reformer inlet line for receiving liquid fuel from the fuel line, the reformer configured to reform the alcohol in the alcohol-gasoline mixture of the fuel into a reformate mixture comprising hydrogen gas and gasoline; and a buffer tank in fluid communication with the reformer via a reformer outlet line for receiving the reformate mixture, the buffer tank configured to disengage the hydrogen gas from the gasoline in the reformate mixture, wherein the buffer tank comprises a liquid fuel outlet in fluid communication with the fuel line for re-introducing the gasoline as a liquid into the fuel line, and a reformate gas outlet for delivering the reformate gas to a reformate line through which the reformate gas is delivered to the engine.

In another aspect, a method of reforming alcohol on-board a vehicle having an internal combustion engine generally comprises delivering liquid fuel comprising an alcohol-gasoline mixture to the internal combustion engine, wherein the liquid fuel is delivered via a fuel line; selectively diverting a portion of the liquid fuel in the fuel line to a reformer via a reformer inlet line; reforming the alcohol in the alcohol-gasoline mixture of the fuel into a reformate mixture comprising hydrogen gas and gasoline using the reformer; delivering the reformate mixture to a buffer tank via a reformer outlet line; disengaging the hydrogen gas from the gasoline in the buffer tank; re-introducing the gasoline from the buffer tank as a liquid into the fuel line at a pre-selected flow rate; and delivering the reformate gas from the buffer tank to a reformate line through which the reformate gas is delivered to the engine.

Other features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
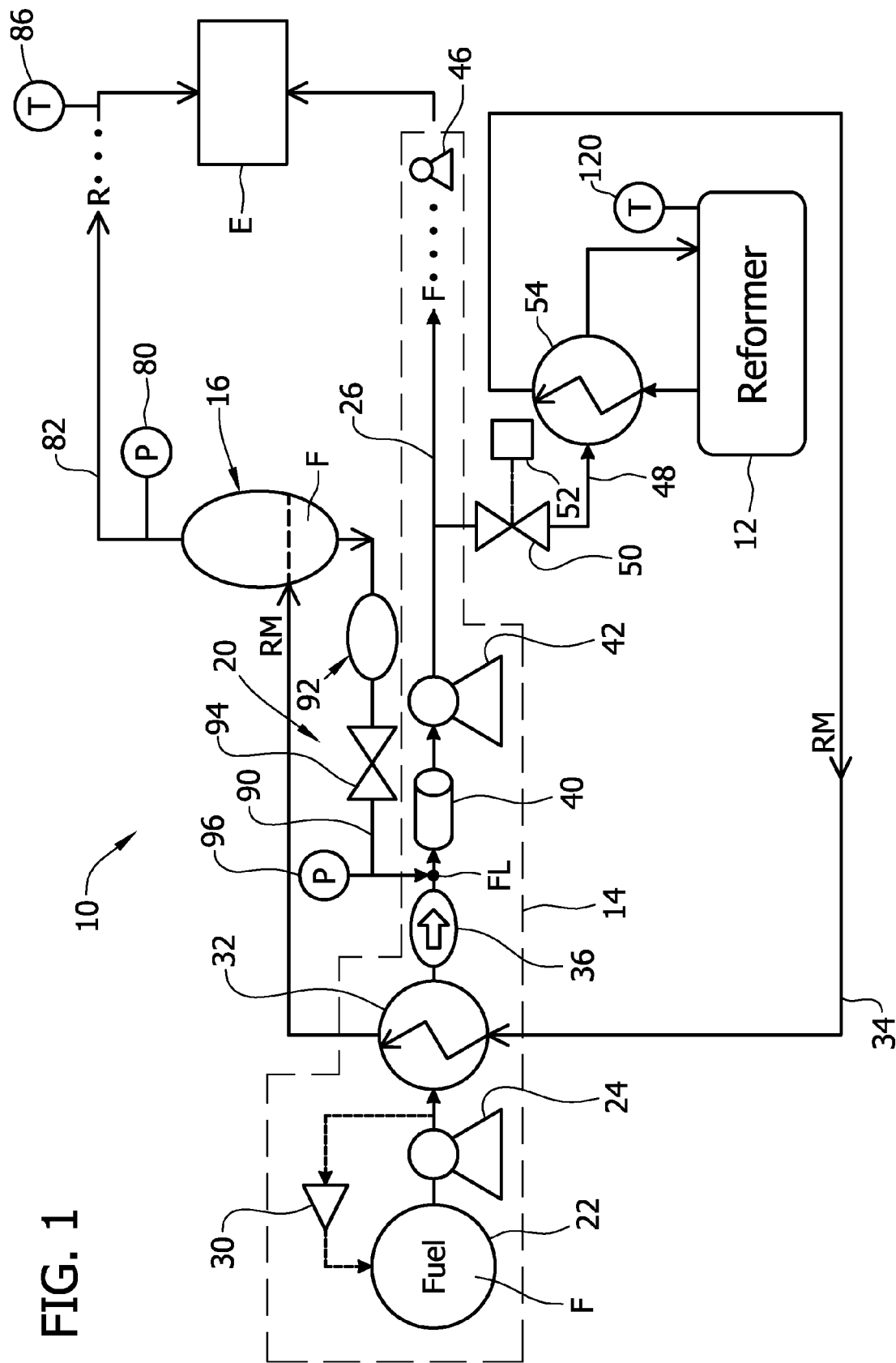
FIG. 1 is a schematic of an alcohol reforming system for use on-board a vehicle including an internal combustion engine.

Referring to FIG. 1, an alcohol reforming system for an internal combustion engine power system is generally indicated at reference numeral 10. In general, the reforming system 10 comprises a reformer 12 for reforming liquid fuel F comprising an alcohol-gasoline blend (or mixture) into a reformate mixture RM including reformate gas R and vaporized liquid. A fuel system 14 delivers the liquid fuel F to the reformer 12 and an internal combustion engine E. From the reformer 12, the reformate gas R may comprise hydrogen (H₂), carbon monoxide (CO), and methane gas CH₄, and the vaporized liquid may comprise gasoline, unreformed alcohol, and acetaldehyde. As explained below, the vaporized liquid will be condensed after the reformate mixture RM exits the reformer 12. This vaporized liquid may also be referred to herein as fuel F, since it primarily includes gasoline. A buffer tank, generally indicated at 16, receives the reformate mixture RM and disengages (i.e., separates) the reformate R from the condensed fuel F (or liquid condensate or liquid fuel). A fuel re-introduction system, generally indicated at 20, re-introduces the condensed fuel F into the fuel system 14, as explained in detail below.

Referring still to FIG. 1, the fuel system 14 comprises a fuel tank 22 for storing a quantity of the gasoline-alcohol blend (or mixture) fuel F on-board the vehicle. In one embodiment the fuel F comprises ethanol-gasoline blend, such as E85 (i.e., 85% ethanol and 15% gasoline), or E20, or E50, or any other percentage of ethanol blended with gasoline. Many of these fuels F are presently commercially available at fuel stations. A first pump 24 is in fluid communication with the interior of the tank 22 for introducing the fuel F into a fuel line 26 (e.g., conduit, pipe, tubing) of the fuel system 14. The fuel line 26 fluidly connects the components of the fuel system 14, as explained hereinafter. The first pump 24 may be a low pressure pump, as is generally used in modern, commercial vehicles. In one example, the pressure in the fuel system line 26 immediately downstream of the first pump 24 is limited by a relief valve 30 set to open at a pressure at least about two bar below the pressure setpoint of the buffer tank 16. In another embodiment, an actuated valve (not shown) controlled by a pressure sensor can also be employed for this purpose.

Downstream of the first pump 24 is a first heat exchanger 32 which is also in fluid communication with a reformer outlet line 34 that delivers the reformate mixture RM from the reformer 12 to the buffer tank 16. At the first heat exchanger 32, the liquid fuel F from the fuel tank 22 cools the reformate mixture RM from the reformer 12, and in turn, the fuel is heated by the reformate mixture. An example of a suitable heat exchanger is a flat-type brazed heat exchanger with 2 ft² of heat exchanger area, such as a heat exchanger commercially available from McMaster Carr, having product number 35115K61.

After flowing through the first heat exchanger 32, the fuel F flows through a check valve 36 and into a reservoir chamber 40. As shown in FIG. 1, the fuel re-introduction system is fluidly connected to the fuel system line 26 at a fuel re-introduction location FL that is intermediate the fuel system check valve 36 and the reservoir chamber 40. The check valve 36 inhibits backflow of fuel F (from both the fuel tank 22 and the buffer tank 16) in the fuel system line 26 toward the fuel tank 22. The reservoir chamber 40 maintains a suitable volume of fuel F intermediate the fuel re-introduction location FL and a second fuel pump 42. That is, the reservoir chamber 40 is downstream of the fuel re-introduction location FL and upstream of the second fuel pump 42. The reservoir chamber 40 may be a container having an increased volume compared to the fuel line 26, or the reservoir chamber may be a suitable length of tubing, having a suitable volume, between the fuel re-introduction location FL and a second fuel pump 42. In one example, the volume capacity of the reservoir chamber 40 may be the volume of fuel F used by the engine E at mid-load in about 1 second. The reservoir chamber 40 may include a mixer (e.g., a static mixer) to homogenize the fuel F from the fuel tank 22 and the fuel F from the buffer tank 16. As can be understood, the fuel from the buffer tank 16 is depleted of alcohol because it has passed through the reformer 12.

The second fuel pump 42 may be a high pressure pump, and in particular, may be a direct injection fuel pump. The fuel pump 42 provides the pressure required to drive the fuel F through the reformer 12 and also delivers fuel to fuel injectors 46 via a fuel rail (not shown). From the fuel line 26, the fuel F is diverted and enters a reformer inlet line 48 (e.g., pipe, conduit, tubing) that delivers the fuel to the reformer 12. The supply of fuel F into the inlet reformer line 48 and to the reformer 12 is controlled by a control valve 50, which is itself controlled by a controller 52. The controller 52 may comprises a processor (e.g., a microprocessor), a memory including a set of instructions for controlling the processor. Alternatively, control can be suitably provided by the engine control module (ECM). Methods of controlling the control valve 50, and therefore, controlling the flow rate of fuel F into the reformer 12 using the controller 52 are set forth below. After flowing through the valve 50, the fuel F flows through a second heat exchanger 54, where it is heated by reformate mixture RM flowing out of the reformer 12 via the reformer outlet line 34 (e.g., pipe, conduit, tubing). In one embodiment, the second heat exchanger 54 functions as a vaporizer, whereby the fuel F is vaporized before entering the reformer 12. The second heat exchanger 54 may be similar or identical to the first heat exchanger 32 (i.e., the second heat exchanger may be a flat-type brazed heat exchanger with 2 ft² of heat exchanger area, such as a heat exchanger commercially available from McMaster Carr, having product number 35115K61).

After flowing through the second heat exchanger 54, the liquid fuel F flows into the reformer 12. The reformer 12 may include powder catalysts comprising copper and nickel where the reforming of alcohol (e.g., ethanol) in the fuel F is driven by exhaust heat. The reformer 12 is typically maintained at a temperature of about 300-350° C. using the exhaust heat. The catalyst in the reformer 12 catalyzes the transformation of the alcohol component of the fuel into a mixture of permanent gases according to equations 1 and 2 for ethanol and equation 3 for methanol.

$$CH_3CH_2OH \rightarrow CH_3CHO + H_2 \qquad (1)$$

$$CH_3CHO \rightarrow CH_4 + CO \qquad (2)$$

$$CH_3OH \rightarrow CO + 2H_2 \qquad (3)$$

Gasoline vaporizes but does not react within the reformer 12 (i.e., gasoline does not react at the operating temperature of the reformer). Although the embodiment shown in FIG. 1 has only one reformer 12, if the vehicle has dual exhaust pipes, two reformers 12 can be employed, one on each pipe, preferably with separate fuel control valves 50. The reformer 12 may be of another type without departing from the scope of the present invention.

The reformate mixture RM exits the reformer 12 and enters the reformer outlet line 34. At least a portion of the gasoline in the reformate mixture is vapor as it exits the reformer 12. The reformate mixture RM flows through the second heat exchanger 54 where the mixture is cooled by the incoming liquid fuel F (i.e., heat is transferred from the reformate mixture RM to the fuel F). The reformate mixture RM then flows through the first heat exchanger 32, where the reformate mixture is further cooled by the incoming fuel F. Cooling of the reformate mixture RM at the second and first heat exchangers 54, 32 promotes condensation of the liquid F (e.g., the gasoline) in the reformate mixture RM.

Figure 2:
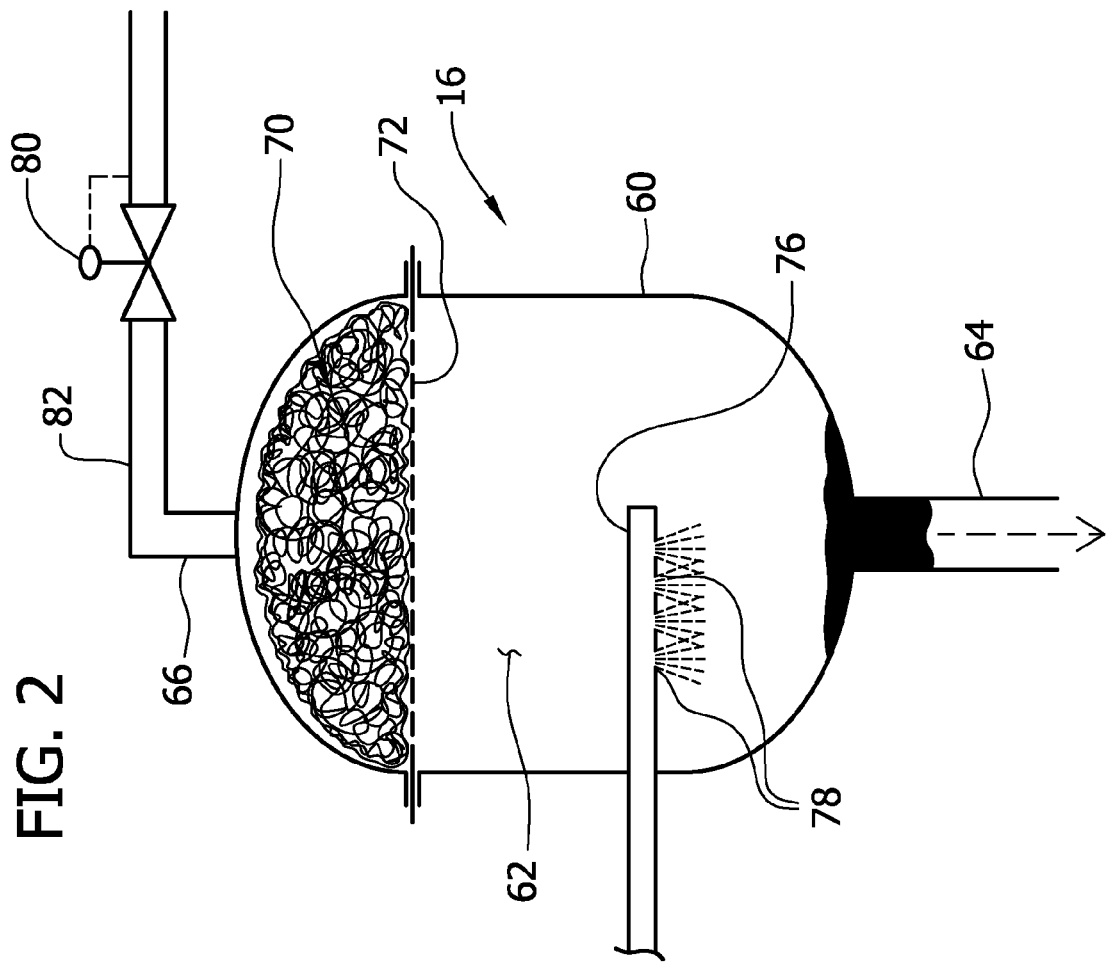
FIG. 2 is a schematic of a buffer tank of the alcohol reforming system in FIG. 1.
Figure 3:
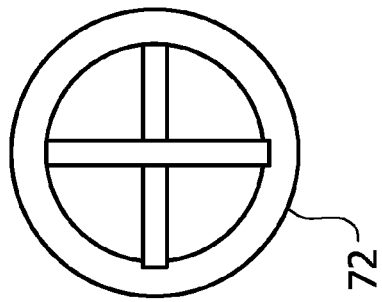
FIG. 3 is a demister support of the buffer tank in FIG. 2.

After flowing through the first heat exchanger 32, the reformate mixture RM flows to the buffer tank 16. Referring to FIG. 2, in one embodiment, the buffer tank 16 includes a body 60 defining an interior volume 62. A liquid or condensate outlet 64 in communication with the interior volume 62 is located at a bottom or lower portion of the body 60, and a reformate outlet 66 in communication with the interior volume is located at a top or upper portion of the body. A demister 70 comprising a pad of demisting material, for example, is located in at an upper portion of the body 60 between the interior volume 62 and the reformate outlet 66. The demister 70 inhibits condensate droplets (or mist) from entering the reformate outlet 66. Suitable demisting materials, such as metal mesh, can be obtained from Amistco Separation Products of Alvin, Tex. A demister support 72 may retain the demister 70 in the upper portion of the body 60 while allowing reformate R to pass through the demister support and the demister 70 and enter the reformate outlet 66. As an example, the demister support 72 may include a wire or perforated metal screen and the demister 70 may be compressed between the support and the upper portion of the body 60 in order to prevent bypass.

In the illustrated embodiment, the reformate mixture RM enters the interior volume 62 of the buffer tank via a reformate mixture inlet 76. In the illustrated embodiment, the inlet 76 comprises a horizontal inlet conduit (e.g., pipe or tubing) received in the interior volume 62. The inlet conduit 76 includes downwardly directed spray holes 78 for directing the reformate mixture RM toward a bottom of the buffer tank body 60. In another example, reformate downflow in the buffer tank 16 can be achieved using deflector plates or an angled inlet tube. The bottom of the body 60 may funnel (e.g., have a conical or inverted dome shape) in order drain liquid condensate to the re-introduction system 20 located below the buffer tank 16. As such, the reformate mixture RM that enters the buffer tank 16 separates into gas (e.g., hydrogen ($H_2$), carbon monoxide (CO), and methane gas $CH_4$) and liquid condensate (e.g., gasoline, unreformed alcohol, and acetaldehyde). The condensate (i.e., fuel F) flows to the bottom of the interior volume 62 and enters the re-introduction system 20 via the condensate outlet 64. The reformate R flows through the demister support 72 and the demister 70 and into the reformate outlet 66.

In one embodiment, the buffer tank 16 defines an interior volume 62 sufficient to supply enough reformate R for cold start of the engine E. Clean cold start can be achieved by fueling the engine with 50% reformate, and 50% E85 or similar ethanol or methanol-rich gasoline blend fuel until the catalytic converter reaches lightoff temperature. Larger buffer tank sizes provide a larger reserve, but this may be balanced against the space constraints on the vehicle. The body 60 cross section may be large enough to reduce the reformate R superficial velocity below that required to suspend liquid droplets, although for a buffer tank body 60 having a cross sectional diameter of 10 cm or greater this may not be a concern.

Referring again to FIG. 1, a pressure sensor 80 (e.g., a pressure transducer) monitors the pressure of the reformate R in buffer tank 16. The pressure sensor 80 may be used to correct reformate fuel injector pulsewidths for variations in reformate pressure. In the illustrated embodiment, the pressure sensor 80 is immediately downstream of the buffer tank 16 and measures the pressure of the reformate R in a reformate line 82 (e.g., pipe, conduit, tubing). The reformate line 82 may lead downstream to reformate port injectors (not shown) for delivering the reformate R to the engine E. Although the detailed mode of operation of the engine using alcohol reformate R is outside the scope of the present disclosure, which is directed to supplying a stream of reformate R, substantially free of condensate droplets to an engine utilizing either port fuel injection or fumigation in order to introduce the reformate into the engine, such modes of operation are known to those skilled in the art. Furthermore, the present disclosure is intended to supply from about 10% to about 75%, more typically, from about 20% to about 75% of the fuel F to the engine E as reformate R at low-to-mid engine load and more preferably from about 25% to about 60% during cold start and after reformer warmup. At high load (2000 rpm, 8.5 bar NMEP) the dilution tolerance provided by reformate gas R may not improve efficiency in part because the amount of diluent (EGR or excess air) that can be used is limited and also because of the value of the charge cooling of liquid ethanol at high load. The present disclosure does, however, encompass certain general operating principles for reformate utilization as set forth below.

In one embodiment, in order for the reformate injectors to accurately meter reformate R into engine E, the pressure and temperature of reformate R in the reformate rail (not shown) must be known accurately so that the volumetric concentration of reformate can be calculated from the ideal gas law by the engine control unit (e.g., control unit or controller 52 or another control unit). The pressure sensor 80 communicates the pressure of the reformate R in the reformate line 82 and/or the pressure of the reformate R in the buffer tank 16 to the controller (e.g., controller 52). A temperature sensor 86 (e.g., a thermocouple) may be located in the fuel rail (or rails). The fuel rails can act as radiators, thereby cooling the reformate R below the temperature of the reformate in the buffer tank 16. Therefore, it may be preferred to have the temperature sensor 86 located at the fuel rails rather than the buffer tank 16, although the temperature sensor may be located at the buffer tank.

Moreover, the reformate pressure should be above a threshold value in order to accurately meter the reformate R. The threshold pressure depends on the type of injector used, but is typically at least about 4 bar. For this reason, preferably, the engine E will not utilize reformate R when the pressure in the buffer tank 16 is below the threshold value. In addition, the engine E preferably does not utilize reformate at high power points where it does not contribute to efficiency. If the buffer tank 16 is at adequate pressure at the beginning of the drive-cycle, these conditions ensure that engine E will utilize reformate R for cold start (or warm start) and for a further time until the buffer tank 16 reaches its lower pressure limit, then wait for reformer 12 warmup and start of reformer operation which results in a rise in buffer tank pressure.

Referring to FIG. 1, the fuel re-introduction system 20 includes a re-introduction line 90 (pipe, conduit, tubing) which fluidly connects the components of the fuel re-introduction system with the condensate outlet 64 of the buffer tank 16. A flow control device 92 is downstream of the buffer tank 16, and a valve 94 (e.g., a shutoff valve) is downstream of the flow control device to inhibit backflow of condensate fuel into the buffer tank. The valve 94 may be a solenoid valve and may be controlled by a controller, such as controller 52. The pressure in the re-introduction line 90 is measured by a pressure sensor 96 (e.g., a pressure transducer), for reasons explained below. The re-introduction line 90 fluidly connects to the fuel line 26 at the re-introduction location FL, as explained above.

As can be understood, re-introduction of condensate fuel F in the fuel system 14 affects the composition of the fuel F which is routed to the liquid fuel injectors 46. This is because the condensate fuel F consists primarily of gasoline, so when the condensate fuel is combined (e.g., mixed) with fresh incoming fuel F from the fuel tank 22 (e.g., E20 to E85 in the case of ethanol) the alcohol content of the fuel in the fuel line 26 is reduced by dilution. Two operational complications arise from the dilution. First, the reduced ethanol concentration renders the liquid fuel F more susceptible to knock if the engine E is operating at high torque. Fluctuations in the rate at which condensate is blended back into the fresh fuel cause variations in ethanol content or "octane noise." Under adverse circumstances—low ethanol content at a high torque point in the drivecycle—the risk of engine knock increases. Further, variations in the alcohol concentration of the liquid fuel system 14 affect the stoichiometric air:fuel ratio. In modern automobiles, the air:fuel ratio is controlled at its stoichiometric value using an oxygen sensor in the exhaust. Fluctuations in the fuel composition on a timescale of seconds can destabilize the oxygen sensor control loop, potentially compromising the efficacy of exhaust after-treatment and reducing fuel economy.

In order to prevent excessive variation in the alcohol (e.g., ethanol) content of the fuel F supplied to the liquid fuel injectors 46, it is preferable to maintain a steady drain of condensate fuel F from the buffer tank 16 at a rate that is close the rate of accumulation in the buffer tank. This is equivalent to maintaining a constant condensate level in the buffer tank 16. In general, the object is to maintain a steady trickle of condensate back into the fuel system 14 and avoid abrupt slugs of condensate flow. Introduction of condensate fuel F upstream of the second pump 42, as shown in FIG. 1, is preferred because pressure downstream of the second pump will typically exceed pressure in the buffer tank 16. This is particularly true if the engine E utilizes direct fuel injection (DI), but backpressure due to the reformer 12 can also be significant.

One way to achieve control of condensate level and flow is to provide continuous monitoring of condensate level in the buffer tank 16 while controlling level using the solenoid valve. Level can be monitored by a float or by conductance or capacitance probes (not shown), and the flow control device or flow restrictor 92 is installed between the buffer tank 16 and the solenoid shutoff valve 94 in order to minimize peak condensate drain flowrates. The solenoid valve 94 may be closed whenever the pressure in the fuel line 26, monitored by the pressure sensor 96, exceeds the pressure of the buffer tank 16. The solenoid valve 94 may also be used to shut off condensate flow when the engine E is operating at high BMEP, as described below.

The flow restrictor 92 may be sized to limit condensate flow at the buffer tank pressure to from about 4 to about 10 times the average rate of condensate flow. The average condensate flow can be estimated if the design ratio of reformate to liquid fuel is known. For example, for an E50 vehicle using 30% reformate in the engine (with 70% liquid fuel) at 100% ethanol conversion in the reformer, condensate flow averages 30% of the average total fuel flow. It is prudent to assume some degree of alcohol "slip" in the reformer. Thus the flow restrictor is preferably sized to about 40% of total fuel flow for an E50 vehicle. In other embodiments, float valves may be effective. A float valve does not rely on a level sensor which is vulnerable to level noise due to liquid slosh in a moving vehicle, although use of a flow restrictor smoothes the flow noise.

Figure 4:
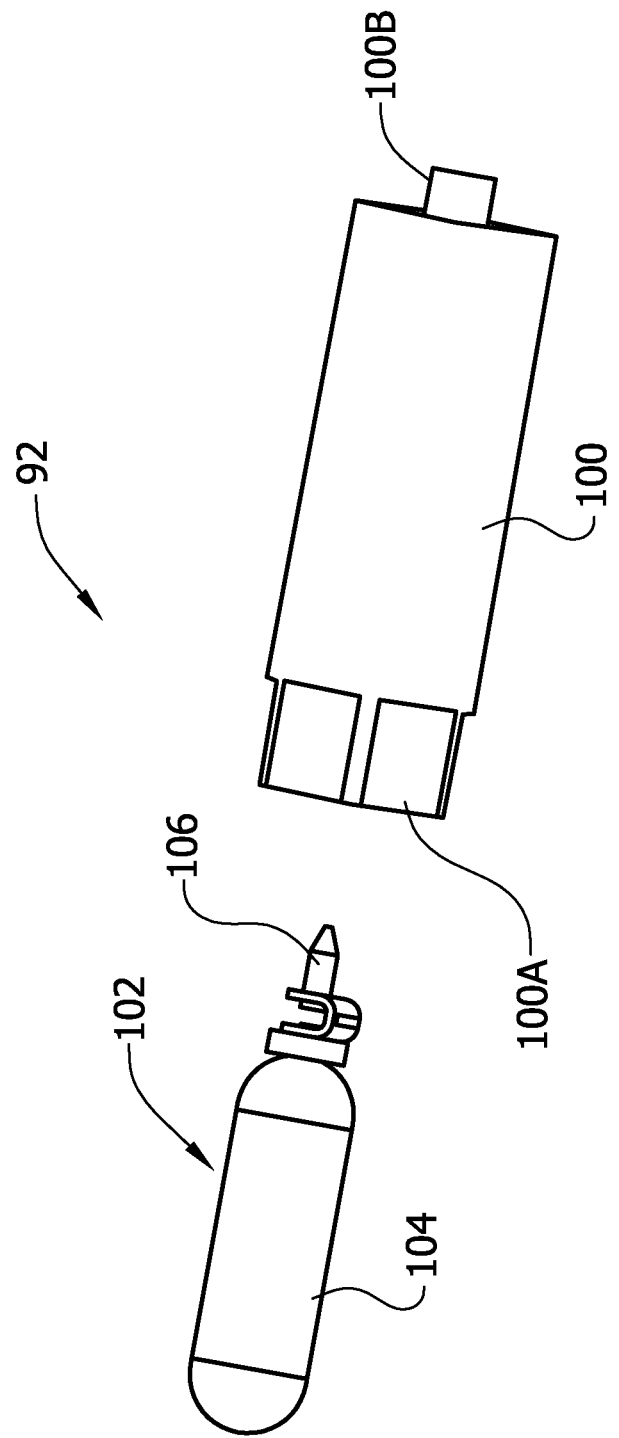
FIG. 4 is a schematic exploded perspective of a pintle valve of the alcohol reforming system in FIG. 1.
Figure 5:
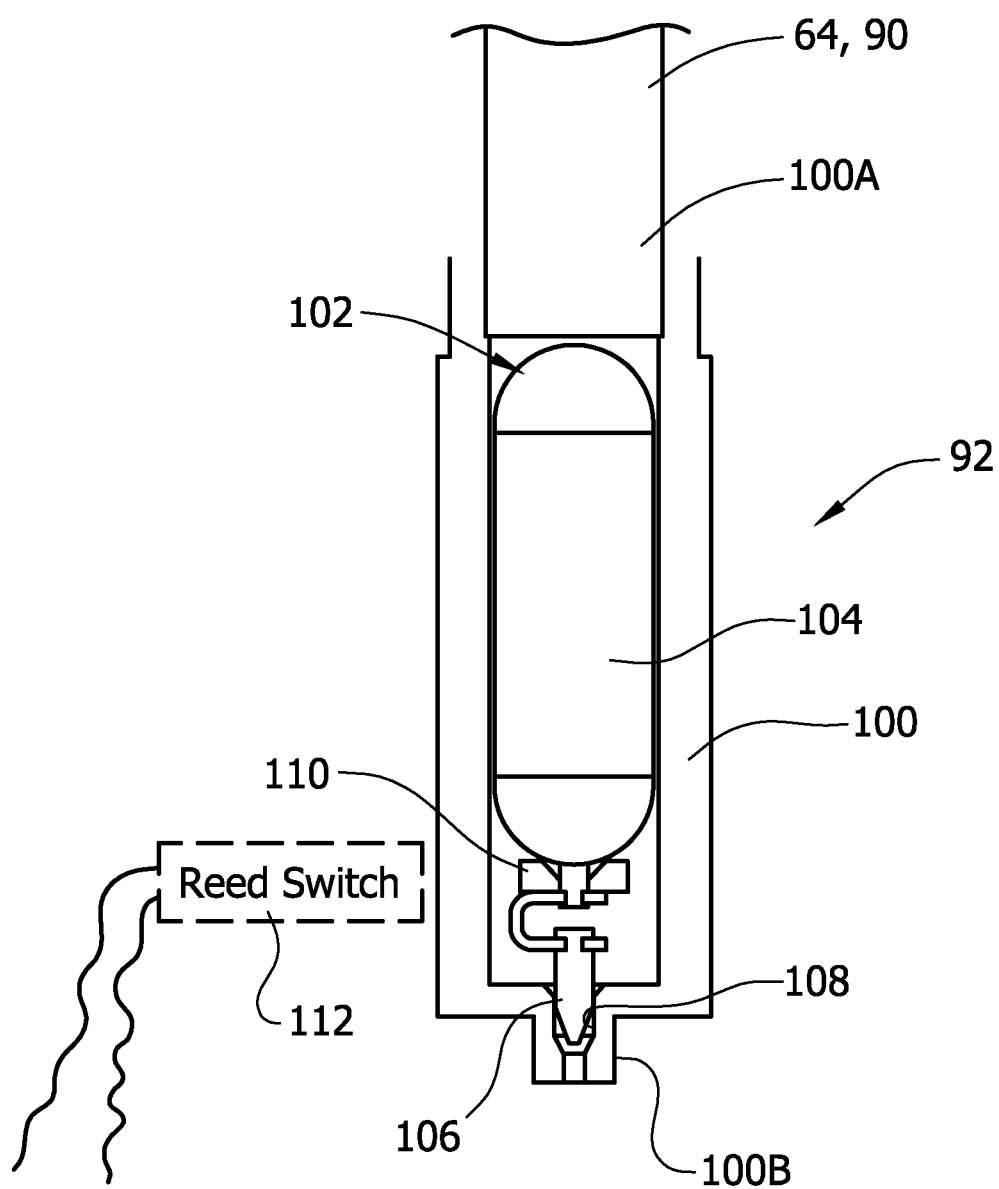
FIG. 5 is a schematic cross section of the pintle valve in FIG. 4, with the valve in the open position.
Figure 6:
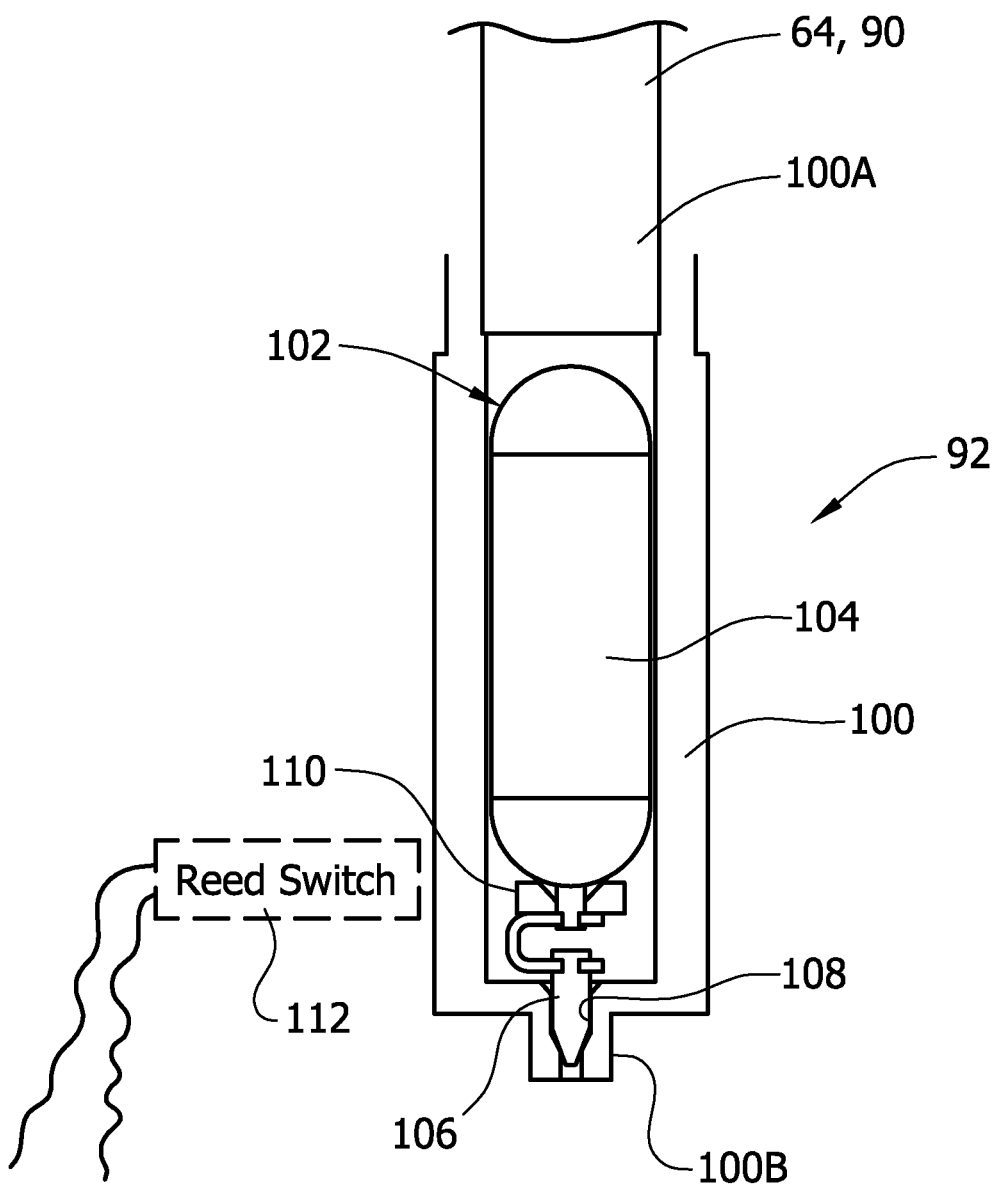
FIG. 6 is similar to FIG. 5, but with the valve in the closed position.

Referring to FIGS. 4-6, in one example the flow restrictor 92 may comprise a float or "pintle" valve. In this example, the solenoid valve 94 is not necessary for condensate level control although it is retained for other purposes, and the level sensors can be omitted. Float valves are a well-known, inexpensive, and reliable means of maintaining level in a vessel, for example, a small engine carburetor bowl. As shown in FIG. 4, the valve 92 includes a valve body 100 having an inlet port 100A fluidly connected to the outlet 64 or the line 90 and an outlet port 100B fluidly connected to the line 90. A stem, generally indicated at 102, includes a float 104 and a conical-shaped disc 106 that fits within a seat 108 (FIGS. 5 and 6) of the body 100. Referring to FIG. 5, when fuel condensate level is low, the disc 106 settles into a conical seat (FIGS. 5 and 6), and inhibits condensate from flowing out the outlet 100B. Referring to FIG. 5, as fuel condensate F accumulates, the stem 104 floats off the seat 108, enabling flow of condensate from the buffer tank 16 through the line 90. For proper operation, the pressure downstream of the buffer tank 16 and float valve 92 is preferably maintained below the pressure in the buffer tank in order to drive condensate out of the tank when the float valve opens and prevent backflow of liquid into the buffer tank. In the illustrated embodiment, the float valve 92 includes a permanent magnet 110 attached to the stem 102. A reed switch 112 or other device adjacent the float valve 92 monitors the position of the float stem 102 in the body 100, and communicates the position to a controller (e.g., controller 52) to provide onboard diagnostics, assuring correct operation of the float valve.

Now that the individual components of the alcohol reforming system 10 have been described, the present disclosure will now describe exemplary operations of the reforming system 10.

Control of Liquid Fuel (F) Flowrate to the Reformer

As has been discussed, the second pump 42, which may be a direct injection fuel pump, provides the pressure required to drive fuel F through the reformer 12. Direct injection fuel pumps can be either electric or mounted on the camshaft. This pump 42 supplies fuel to both the fuel injectors 46 (via a fuel rail) and to the reformer 12, via the control valve 50.

At low-to-medium engine load, the flow of fuel F to the reformer 12 is preferably controlled based on pressure in the buffer tank 16, with the object of maintaining steady buffer tank pressure. "Low-to-medium engine load" in this case means points in the drivecycle in which the engine E can operate knock-free despite the loss of octane due to consumption of ethanol by the reformer 12. "Feed forward" control based on the amount of reformate R actually being consumed by the engine E can be used, although this approach may be complicated by variations in the composition of fuel F being fed to the reformer 12. In a one example, a modified version of proportional-integral-derivative (PID) control is used in which only the proportional "P" and integral "I" terms are utilized. In this example, the controller 52 or another controller may be preprogrammed with instructions for operating the reforming system 10 in accordance with the description below.

A full PID control scheme may not be preferred because the highly transient engine load makes the time derivative ("D") noisy and not useful for control. A "PI" scheme is therefore used, based only on the difference between setpoint pressure and the instantaneous pressure in the buffer tank "P" and the integral term "I." The control equation is given below in terms of ethanol flowrate only (kg/hr). Gasoline riding along with the ethanol is not reformed and does not influence buffer tank pressure.

$$\text{Flowrate}\left(\frac{\text{kg}}{\text{hr}}\right) = K_p\left(\frac{\text{kg}}{\text{hr}-\text{bar}}\right)*(p - p_{set}) + K_i\left(\frac{\text{kg}}{\text{hr}-\text{bar}-\text{min}}\right)*\int_{t-t_{int}}^{t}(p - p_{set})dt$$

In this equation, $K_p$ and $K_i$ are the parameters which govern PI control along with $t_{int}$ which parameterizes how far back in time the integral of the error function extends.

In addition to the PI control scheme that controls buffer tank pressure, a maximum flowrate to the reformer 12 may be fixed, which represents the maximum flow which the reformer can accept without developing unsafe backpressure. The value of the maximum flow depends on the design of the reformer 12 and the catalyst used. In addition, a maximum pressure, based on the pressure rating of the buffer tank 16 with a suitable safety factor, should be incorporated into the control algorithm cutting off fuel flow to the reformer 12 when the buffer tank pressure hits the limit. This portion of the control algorithm may incorporate hysteresis.

Preferably, fuel F is not supplied to the reformer in significant quantity (e.g., greater than about 0.1 kg/hour) unless the reformer is at an adequate temperature to enable the catalyst to reform the fuel, typically at least about 275° C. Thus, the reformer may be equipped with one or more thermocouples 120. A very low flowrate of fuel F, such as less than or equal to about 0.1 kg/hour, may be supplied to the reformer 12 during the warmup period as this enables a more accurate measurement of reformer temperature while generating negligible amount of condensate in the buffer tank 16.

Fuel F is supplied to the reformer 12 for a brief period following engine E shutoff until the maximum pressure buffer tank pressure 16 is achieved or the reformer falls below the minimum operating temperature. This utilizes residual heat in the reformer 12 that would otherwise be lost to the environment in order to fully charge the buffer tank 16 with reformate R. The condensate fuel shutoff valve 94 is preferably closed during this period following engine shutoff and opened at cold start in the next drivecycle. As a result, the liquid fuel is enriched in gasoline during cold start, which reduces hydrocarbon emissions.

Fuel Management when the Engine is at High Power

There are intervals in the drivecycle in which the engine E is operating at relatively high torque (BMEP). Maintaining a high ethanol content in the liquid fuel F is preferred during these periods in order to avoid knock. It is may be preferred to use only liquid fuel F without reformate R at high power points in order to maximize volumetric efficiency and because the efficiency improvement due to reformate is reduced at high BMEP.

For this reason, during high torque intervals the solenoid valve 94 downstream of the buffer tank 16 may be closed, thereby cutting off recycle of fuel condensate F. The condensate is nearly pure gasoline. Thus condensate recycle reduces the ethanol content of the liquid fuel F. In addition, preferably, the reformer fuel feed rate is increased to approximately its maximum value for several seconds. This serves to flush the mixing volume with fresh fuel from the fuel tank 22. The high flow interval to the reformer 12 may be chosen to pass approximately one volume defined by the reservoir 40 through the reformer.

Utilization of Mid-Level Ethanol Blends (20-40%)

It is preferred to utilize a compression ratio greater than about 10:1 in vehicles using ethanol blends of 20% or higher in order to improve efficiency. For relatively low mid-level blends, generally E20-E40 (by volume), the reforming system 10 may be managed in order to maintain sufficient ethanol in the liquid fuel to avoid knock. The amount of ethanol required depends on the compression ratio and the high power threshold, above which only liquid fuel (without reformate) is used. The same considerations apply to methanol/gasoline blends in the 20-40% (by volume) methanol range.

In one example, for fuels in the E20-E40 range, the ratio of fuel flow to the reformer 12 to the total fuel flow from the second pump 42 (flow to reformer and fuel injectors 46 combined) is held below a fixed value. This prevents the reformer 12 from stripping too much ethanol from the fuel. An optimized split ratio can be calculated based on the ethanol content of the fresh fuel F and the ethanol conversion expected from the reformer 12. For example, for an E30 fuel (30% ethanol) with 80% reformer conversion, the ethanol concentration in the liquid fuel F to the fuel injectors 46 ("$E_{PFI}$") can be calculated from the split ratio ("SR") by solving the following equation numerically or via the quadratic formula.

$$0 = -80\% \cdot (SR) \cdot E_{PFI}^2 + [1 + 80\% \cdot (SR)] \cdot E_{PFI} - 30\%$$

The same equation can be used for other reformer conversions or ethanol content by changing the 80% and 30% in the equation to the appropriate values.

Figure 7:
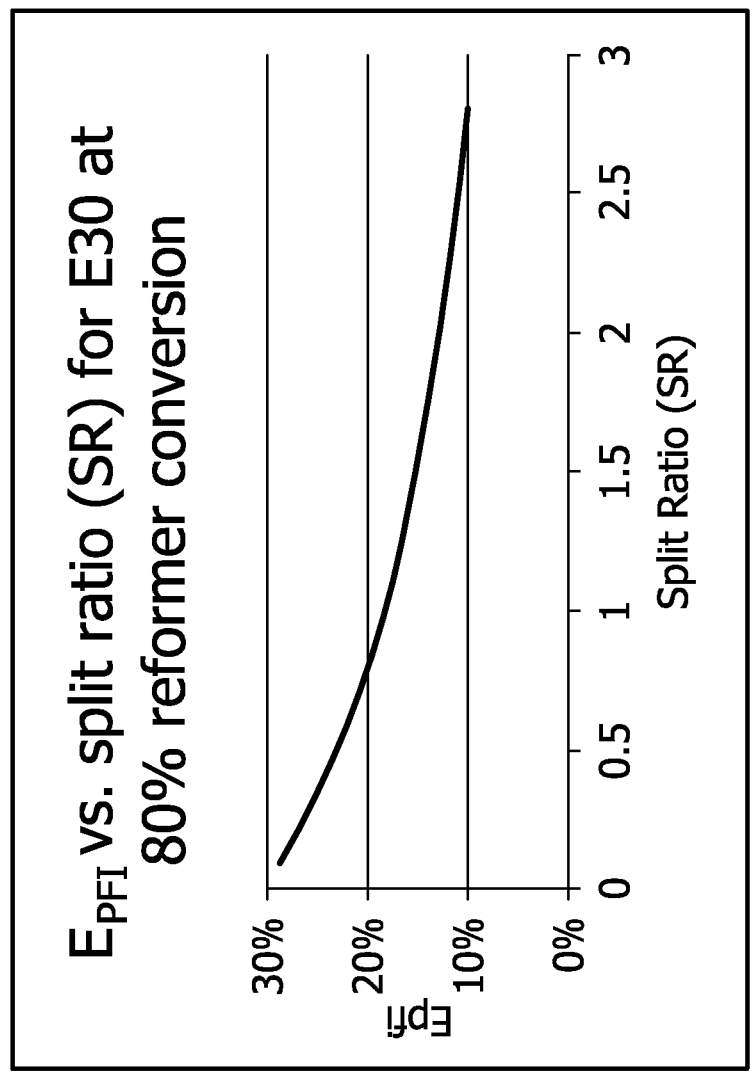
FIG. 7 is a graph showing the $E_{PFI}$ vs. split ration (SR) for E30 at 80% reformer conversion.

FIG. 7 shows liquid ethanol content, $E_{PFI}$ as a function of the split ratio SR for the case of E30% with 80% reformer conversion. In order to maintain 20% ethanol in the liquid fuel, the split ratio, SR, should not be allowed to exceed 0.8. This is adequate for a compression ratio of 12:1.

Reforming with Lower Alcohol Blends (E5-E15)

The present reforming system 10 may also be used with fuels containing 5-15% methanol or ethanol (by volume), with a main value consisting of reductions of startup emissions. The configuration described above and shown schematically in FIG. 1 is preferably modified slightly in a vehicle intended to operate only on fuels with alcohol levels of 15% by volume or below. These two changes reduce the cost and complexity of the reforming system while ensuring that adequate reformate supply and fuel-air mixing capability is achieved for clean cold start.

First, all of the condensate in the buffer tank 16 can be returned to the fuel tank 22. The re-introduction system 20 is intended only to provide enough reformate over the drivecycle to pressurize the buffer tank 16 and enable low emissions at cold start. This requires a minimal amount of fuel F. Returning alcohol-depleted reformate to the fuel tank 22 will not appreciably change the octane rating or other characteristics of the fuel. Second, a separate fuel rail for reformate R is not required. Reformate R can be fumigated into the air supply. U.S. Publication No. US 2012/0097117 A1, the entirety of which is herein incorporated by reference, describes fumigation of reformate using a supercharger. A gas carburetor could also be employed.

As can be seen from the above disclosure, in general the reformer 12 is sized to provide reformate sufficient for mid-load operation of the engine E and provide no reformate at high engine load. The buffer tank enables reformate to be used during intervals of high-mid load operation, typically 2400 rpm, 6 bar BMEP.

In one example, the alcohol reforming system is configured to perform the following operations, each of which has been described above:

1. maintain adequate buffer tank pressure to enable reliable operation of the fuel injectors which supply reformate (e.g., $H_2$, CO, and $CH_4$) to the engine throughout as much of the drivecycle as possible;

2. disengage (i.e., separate) condensable liquids, primarily gasoline, from reformate; if droplets of condensate (e.g., gasoline) are present in the reformate stream, some fuel injection events may provide excessive fuel leading to cycle-to-cycle and cylinder-to-cylinder variations in the air:fuel ratio and increased tailpipe hydrocarbon and CO emissions; and 3. re-introduce the liquid condensate from the buffer tank 12 into the fuel system.

The latter two operations are significantly more challenging at lower blend levels than for from 20-50% alcohol by volume in the fuel ("E20" to "E50" for ethanol). First, with respect to disengaging condensable liquids, the higher levels of condensate due to the gasoline content increase the liquid disengagement load although, as described above, this can be managed by proper system design and operation according to one example.

One embodiment of the reforming system 10 of the present disclosure enables a steady return of the condensate to the fuel system with minimal octane noise while providing a reliable supply of reformate essentially free of condensate droplets at an adequate pressure to enable operation of the gaseous fuel injectors. These goals can be achieved in a reliable, cost-effective manner by a strategy comprising one or more of the following operations, each of which has been explained in more detail above:

1. use of substantially all of the fresh, alcohol-containing fuel F to cool the reformate mixture RM prior to introduction into the buffer tank 16;
2. introduction of reformate mixture RM into the buffer tank 16 with flow directed downward;
3. inclusion of the demister 70 in the top of the buffer tank 16 to complete demisting;
4. monitoring of buffer tank pressure at least once per second in order to achieve tight control of the amount of reformate R injected by the gaseous fuel injectors (not shown);
5. the flow control device 92 adjacent the bottom of the buffer tank 16, such as a flow restrictor or a float valve, which suppresses abrupt discharge of slugs of fluid condensate from the buffer tank 16;
6. the shutoff valve 94, such as a solenoid valve, positioned between the flow control device 92 and the re-introduction location FL where the condensate is re-introduced into the fuel system 14; and
7. for operation with fuels F between 20% and 40% alcohol by volume, limitation of fuel flow to the reformer 12.

Having described embodiments of the invention in detail, it will be apparent that modifications and variations are possible without departing from the scope of the invention defined in the appended claims.

EXAMPLES

The following non-limiting example is provided to further illustrate the present invention.

Example 1

Figure 8:
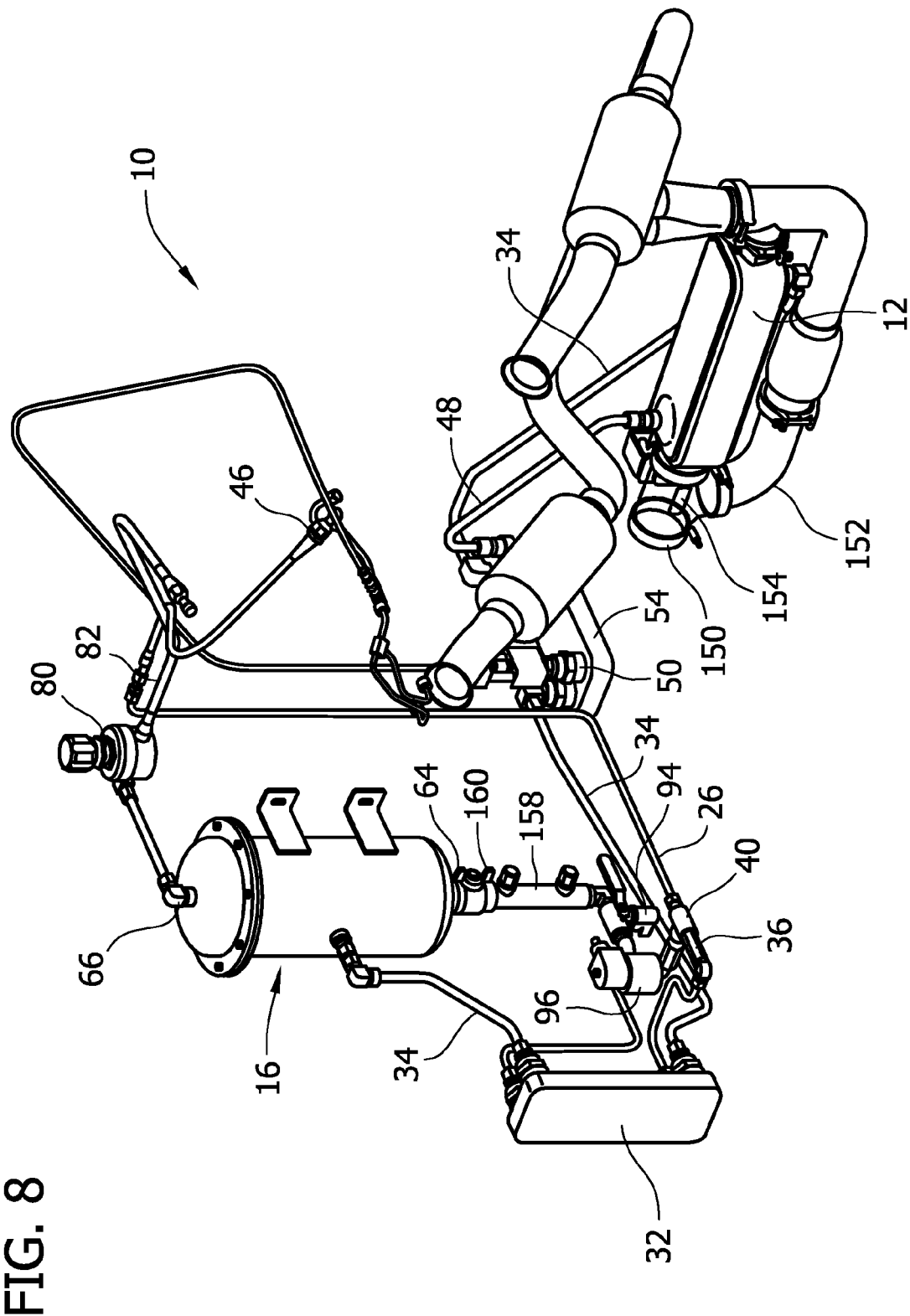
FIG. 8 is a perspective of an alcohol reforming system used in Example 1.

A reforming system generally having the schematic layout shown in FIG. 1 was assembled using a 21-tube, 3-stage vertical tube array reformer loaded with 119 g of copper-palladium on carbon pellets and 105 g of copper-plated nickel sponge catalyst. An overall view of the reforming system is shown in FIG. 8, with like components shown in FIG. 1 being indicated by corresponding reference numerals. The system was designed to couple to a V6 engine. An exhaust line 150 (e.g., a pipe) exiting the reformer 12 and an exhaust bypass line 152 were balanced by a proportional diverter valve 154. The diverter valve 154 utilized two independently actuated disc-valves operated pneumatically. The exhaust diverter valve 154 was controlled, such as by controller 52, so as to maintain the temperature of reformate mixture exiting the reformer 12 at a temperature of 325-350° C. The exhaust lines were fabricated from 20-gauge steel in order to reduce thermal mass and improve heatup time.

Figure 9:
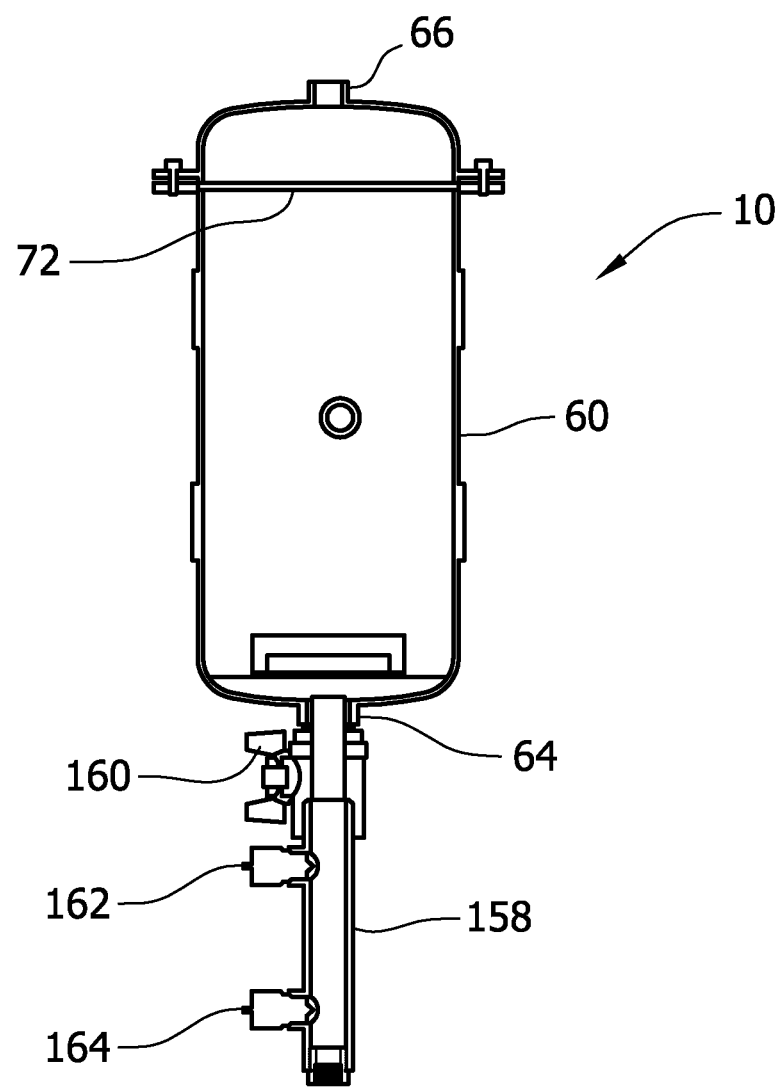
FIG. 9 is an enlarged cross section of a buffer tank and liquid fuel outlet of the alcohol reforming system in FIG. 8.

Flat-plate type brazed heat exchangers with 2 $ft^2$ heat exchange area were used as the first and second heat exchangers 32, 54 (McMaster Carr part number 35115K61). The buffer tank 16 was a 6-inch diameter, 12-inch tall cylindrical vessel with a volume of 5.5 liters. The reformate inlet (not shown) was located 6 inches above the bottom, but did not use the "shower type" configuration shown in FIG. 2. The level of fuel condensate F was controlled using a "known-volume pipe" 158 coupled to the outlet 64 of the buffer tank 16 by a manual shutoff valve 160. The buffer tank 16 is shown in FIG. 9. Liquid level in the pipe 158 was sensed by two optical fluid sensors 162, 164 inserted through ½-inch NPT openings. When condensate level reached the upper sensor 162, it was drained by opening an electrically-powered solenoid valve 94 (FIG. 8), with Teflon seals and an explosion-proof design.

Example 2

The reforming system of Example 1 was coupled to a 3.5 liter V6 engine with twin-independent variable cam timing (TiVCT). The engine utilized direct injection of liquid fuel. A second set of fuel rails enabled port fuel injection of reformate. This second set of fuel rails was fed from the buffer tank 16 via a control valve which maintained stable reformate pressure in the fuel rail. The high pressure pump on the engine used for the direct injection fuels rails also supplied high pressure fuel to the reformer in accordance with the scheme in FIG. 1. The compression ratio was 12:1 when using E85 fuel, but baseline data on gasoline was obtained at 10:1 compression ratio.

Example 3

The engine-reformer system of Examples 1 and 2 was operated at steady state at the "worldwide mapping point": 2.62 bar BMEP, 1500 rpm. This operating point is representative of a typical drivecycle. The engine was operating with a stoichiometric air:fuel ratio ($\lambda=1$) and high levels of internal EGR, achieved by late closing of the exhaust valves. In addition, late closing of the intake valve was utilized to further reduce throttling losses and improve dilution.

The system was supplied with E85 fuel. The engine was fueled with 20% reformate (by mass) produced by the vertical tube reformer supplied through port fuel injectors and 80% E85 supplied through the direct injectors. The condensate was not re-combined with the liquid fuel being fed to the engine in this study in order to make more accurate measurements of efficiency.

Valve and spark timing were optimized at this operating point. The optimal valve timing (and EGR level) in cylinders 1, 2, 4, and 5 led to excessive levels of EGR in cylinders 3 and 6 due to pressure pulses propagating in the exhaust manifolds and into the last cylinders.

Under these optimized conditions, brake thermal efficiency at the worldwide mapping point, 2.62 bar BMEP, 1500 rpm, improved to 28.8% using 80% liquid E84 and 20% reformate by mass compared to 26.4% for 100% liquid E85. Both values were obtained using a 12:1 compression ratio. The efficiency using reformate refers to the efficiency of the entire engine/reformer system.

The buffer-tank/known-volume pipe system removed all liquid condensate during these trials. No evidence of breakthrough of liquid droplets to the reformate fuel rail (which would cause instability of combustion) was observed.

Example 4

The engine-reformer system of Examples 1 and 2 was operated at steady state at the "worldwide mapping point"

using E30 fuel. The reformer operated efficiently on this fuel and the buffer-tank/known-volume pipe system successfully disengaged liquid condensate.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An alcohol reforming system for an internal combustion engine comprising:
a fuel system configured to deliver liquid fuel comprising an alcohol-gasoline mixture to the internal combustion engine, the fuel system including a fuel line through which the liquid fuel is delivered to the engine;
a reformer in selective fluid communication with the fuel line through a reformer inlet line for receiving liquid fuel from the fuel line, the reformer configured to reform the alcohol in the alcohol-gasoline mixture of the liquid fuel into a reformate mixture comprising hydrogen gas and gasoline;
a buffer tank in fluid communication with the reformer through a reformer outlet line for receiving the reformate mixture, the buffer tank configured to disengage the hydrogen gas from the gasoline in the reformate mixture, wherein the buffer tank comprises a liquid fuel outlet in fluid communication with the fuel line for re-introducing the gasoline as a liquid into the fuel line, and a reformate gas outlet for delivering the reformate gas to a reformate line through which the reformate gas is delivered to the engine;
wherein the reformer is configured such that at least a portion of the gasoline in the reformate mixture is vaporized as it enters the reformate outlet line, and
wherein the alcohol reforming system further comprises a heat exchanger in fluid communication with the reformer through a reformer outlet line for receiving and cooling the reformate mixture so that at least a portion of the vaporized gasoline in the reformate mixture is condensed into liquid gasoline before it enters the buffer tank.

2. The alcohol reforming system set forth in claim 1, wherein the heat exchanger is in fluid communication with the fuel line, wherein the heat exchanger is configured to transfer heat from the reformate mixture in the reformer outlet line to the liquid fuel in the fuel line.

3. The alcohol reforming system set forth in claim 2, further comprising a second heat exchanger in fluid communication with the reformer inlet line and the reformer outlet line, wherein the second heat exchanger is configured to transfer heat from the reformate mixture in the reformer outlet line to the liquid fuel in the reformer inlet line.

4. The alcohol reforming system set forth in claim 1 further comprising a control valve in fluid communication with the fuel line upstream of the reformer, and a controller in communication with the control valve for controlling flow of liquid fuel to the reformer through the control valve, wherein the controller is configured to control the control valve and the flow of liquid fuel to the reformer based at least in part on the pressure of the reformate gas in the buffer tank.

5. The alcohol reforming system set forth in claim 4, further comprising a pressure sensor in communication with the buffer tank for measuring the pressure of the reformate gas in the buffer tank, wherein the pressure sensor is in communication with the controller for communication a pressure signal indicative of the pressure of the reformate gas in the buffer tank.

6. The alcohol reforming system set forth in claim 5, wherein the controller is configured to maintain steady state pressure of the reformate gas in the buffer tank under low-to-medium engine load.

7. The alcohol reforming system set forth in claim 6, wherein the controller is configured to control the flow of liquid fuel into the reformer based on at least in part on the flow rate of alcohol in the liquid fuel using a "PI" scheme based on the difference between setpoint pressure and the instantaneous pressure in the buffer tank "P" and the integral term "I" in accordance with the following equation:

$$\text{Flowrate}\left(\frac{\text{kg}}{\text{hr}}\right) = K_p\left(\frac{\text{kg}}{\text{hr}-\text{bar}}\right)*(p-p_{set}) + K_i\left(\frac{\text{kg}}{\text{hr}-\text{bar}-\text{min}}\right)*\int_{t-t_{int}}^{t}(p-p_{set})dt$$

wherein $K_p$ and $K_i$ are the parameters which govern PI control along with $t_{int}$ which parameterizes how far back in time the integral of the error function extends.

8. The alcohol reforming system set forth in claim 1, wherein the buffer tank comprises a body having upper and lower portions and defining an interior volume for receiving the reformate mixture, wherein the liquid fuel outlet is located at the lower portion of the body and the reformate gas outlet is located at the upper portion of the body.

9. The alcohol reforming system set forth in claim 8, wherein the buffer tank comprises a demister in the upper portion of the body intermediate the interior volume and the reformate gas outlet, wherein the demister is configured to allow the flow of reformate gas through the demister and into the reformate gas outlet, and inhibit liquid condensate from entering the reformate gas outlet.

10. The alcohol reforming system set forth in claim 1, further comprising a liquid fuel re-introduction system configured to re-introduce the liquid fuel from the liquid outlet of the buffer tank into the fuel line at a fuel re-introduction location of the fuel line, the fuel re-introduction system comprising a flow control device for controlling the flow of liquid fuel from the liquid outlet of the buffer tank into the fuel line.

11. The alcohol reforming system set forth in claim 10, wherein the flow control device is configured to maintain a steady flow of liquid fuel F from the buffer tank into the fuel line at a rate that is based on the rate of accumulation of liquid fuel in the buffer tank.

12. The alcohol reforming system set forth in claim 11, wherein the flow control device comprises a pintle valve.

13. The alcohol reforming system set forth in claim 10, further comprising a liquid fuel pump in fluid communication with the fuel line, the liquid fuel pump located downstream of the fuel re-introduction location and upstream of a location along the fuel line where the reformer is fluidly connected to the fuel line.

14. The alcohol reforming system set forth in claim 13, further comprising a reservoir chamber downstream of the fuel re-introduction location and upstream of the location along the fuel line where the reformer is fluidly connected to the fuel line, the reservoir chamber defining a volume substantially equal to a volume of liquid fuel used by the engine at mid-load in about 1 second.

15. A method of reforming alcohol on-board a vehicle having an internal combustion engine, the method comprising:
- delivering liquid fuel comprising an alcohol-gasoline mixture to the internal combustion engine, wherein the liquid fuel is delivered through a fuel line;
- selectively diverting a portion of the liquid fuel in the fuel line to a reformer through a reformer inlet line;
- reforming the alcohol in the alcohol-gasoline mixture of the fuel into a reformate mixture comprising hydrogen gas and gasoline using the reformer;
- delivering the reformate mixture to a buffer tank through a reformer outlet line;
- disengaging the hydrogen gas from the gasoline in the buffer tank;
- re-introducing the gasoline from the buffer tank as a liquid into the fuel line at a pre-selected flow rate;
- delivering the hydrogen gas from the buffer tank to a reformate line through which the hydrogen gas is delivered to the engine; and
- demisting the hydrogen gas before the hydrogen gas is delivered to the engine in inhibit liquid gas from being delivered to the engine from the reformate line.

16. The method set forth in claim 15, wherein said re-introducing the gasoline comprises re-introducing the gasoline from the buffer tank as a liquid into the fuel line at a rate that is generally equal to the rate of accumulation in the buffer tank.

17. The method set forth in claim 15, wherein said selectively diverting a portion of the liquid fuel comprises selectively diverting a portion of the liquid fuel based at least in part on the flow rate of alcohol in the liquid fuel.

18. The method set forth in claim 15, further comprising maintaining pressure of hydrogen gas within the buffer tank at at least about 4 bar.

* * * * *